United States Patent [19]

Hartmann

[11] 4,241,932

[45] Dec. 30, 1980

[54] WHEELCHAIR STEERING APPARATUS

[75] Inventor: William F. Hartmann, Syracuse, N.Y.

[73] Assignee: Gerald W. Rothschild, Fayetteville, N.Y.

[21] Appl. No.: 76,586

[22] Filed: Sep. 18, 1979

[51] Int. Cl.³ .............................................. B62B 11/00

[52] U.S. Cl. ............................ 280/265; 280/289 WC; 280/87.1; 297/DIG. 4

[58] Field of Search ...................... 280/265, 269, 87.1, 280/289 WC, 242 WC; 297/423, DIG. 4; 180/DIG. 3

[56] References Cited

U.S. PATENT DOCUMENTS

| | | | |
|---|---|---|---|
| 1,368,611 | 2/1921 | Dahl | 280/265 X |
| 2,368,142 | 1/1945 | Kelley | 280/265 |
| 2,865,223 | 12/1958 | Kope | 280/87.1 X |
| 3,017,199 | 1/1962 | Sechrist | 280/242 WC |
| 3,388,926 | 6/1968 | Bardsley et al. | 280/265 |
| 3,810,658 | 5/1974 | Weimer | 280/242 WC |

*Primary Examiner*—John A. Pekar
*Attorney, Agent, or Firm*—Bruns & Jenney

[57] ABSTRACT

A wheelchair having a turntable rotatably mounted on one footrest thereof. The turntable is operatively connected to the mounting fork of a steering caster by means of an extended link and a lever bar whereby rotational movement of the turntable by the foot of the chair occupant will cause a change in the direction of movement of the chair. An adjustable stop means is arranged to act against the link to prevent the chair from moving into an uncontrollable position and further acts to prevent the mechanism from unduly twisting the occupant's leg in the event the steering caster strikes an obstruction or the like.

8 Claims, 5 Drawing Figures

WHEELCHAIR STEERING APPARATUS

BACKGROUND OF THE INVENTION

This invention relates to a steering mechanism for use in conjunction with a wheelchair and, in particular, to a steering mechanism that allows the chair to be both controlled and propelled by an occupant having the normal responsive use of only one hand.

Oftentimes persons who are confined to a wheelchair have lost the use of one of their hands and possibly one of their legs through injury, a stroke or the like. As a result, it is extremely difficult, if not impossible, for this type of handicapped individual to both propel and maintain directional control of the wheelchair. Although the user may be able to propel the chair using one arm, steering the chair becomes a major problem.

As set forth in U.S. Pat. Nos. 3,017,199; 3,388,926 and 3,810,658, this particular problem has been long recognized in the art. In response thereto, steering devices that are controllable by the leg or foot of the chair occupant have been devised. These prior art devices, which operate quite well, nevertheless have some disadvantages associated therewith that limit their effectiveness. Typically, the steering mechanism provides little or no mechanical advantage to the user and, as a consequence, the user soon becomes tired or loses the strength needed to safely guide the chair. Similarly, in the event one of the chair's swivel casters, which is usually directly coupled to the steering mechanism, strikes an obstruction, the caster will be rapidly and sometimes violently turned from its intended path of travel. This uncontrolled turning motion is usually translated directly through the mechanism to the occupant's foot or leg and, particularly in the case of an infirm individual, can cause harm. The casters can also be turned in a position where the chair cannot be propelled or may even tip over. Lastly, many of the prior art steering devices involve relatively rigid mechanisms which prevent the chair from being folded for convenient storage, as for example in the user's automobile.

SUMMARY OF THE INVENTION

It is therefore an object of the present invention to improve the steering capability of a wheelchair.

A further object of the present invention is to provide a foot operated steering mechanism for use in conjunction with a wheelchair that can be easily operated by an infirm or otherwise incapacitated person.

A still further object of the present invention is to prevent injury to the occupant of a wheelchair equipped with a foot operated steering mechanism.

Another object of the present invention is to prevent the steering casters of a wheelchair employing a foot operated steering mechanism from being forced into a canted position wherein the forward progress of the chair will be prevented or otherwise impeded.

Yet another object of the present invention is to provide a foot operated steering mechanism for use in association with a wheelchair that can be interchangeably mounted upon either the right or left footrest of the chair.

Still another object of the present invention is to provide a foot steering mechanism for maintaining directional control of a wheelchair that will allow the chair to be easily and conveniently folded for storage.

These and other objects of the present invention are attained by means of a wheelchair apparatus having at least one swivel caster that is mounted in a fork attached to the frame of the chair for rotational movement about a vertical axis, a footrest upon which is rotatably mounted a foot-actuated turntable, a lever bar secured to the fork and extending outwardly therefrom, an elongated link that is arranged to connect the extended end of the lever bar with the turntable whereby displacement of the turntable will accomplish directional steering of the caster, and a stop means secured to the turntable for engaging the link so as to regulate the degree of directional freedom afforded the steering caster.

BRIEF DESCRIPTION OF THE DRAWINGS

For a better understanding of these and further features of the present invention, reference is had to the following detailed description of the invention that is to be read in conjunction with the accompanying drawings, wherein.

DESCRIPTION OF THE INVENTION

Figure 1:
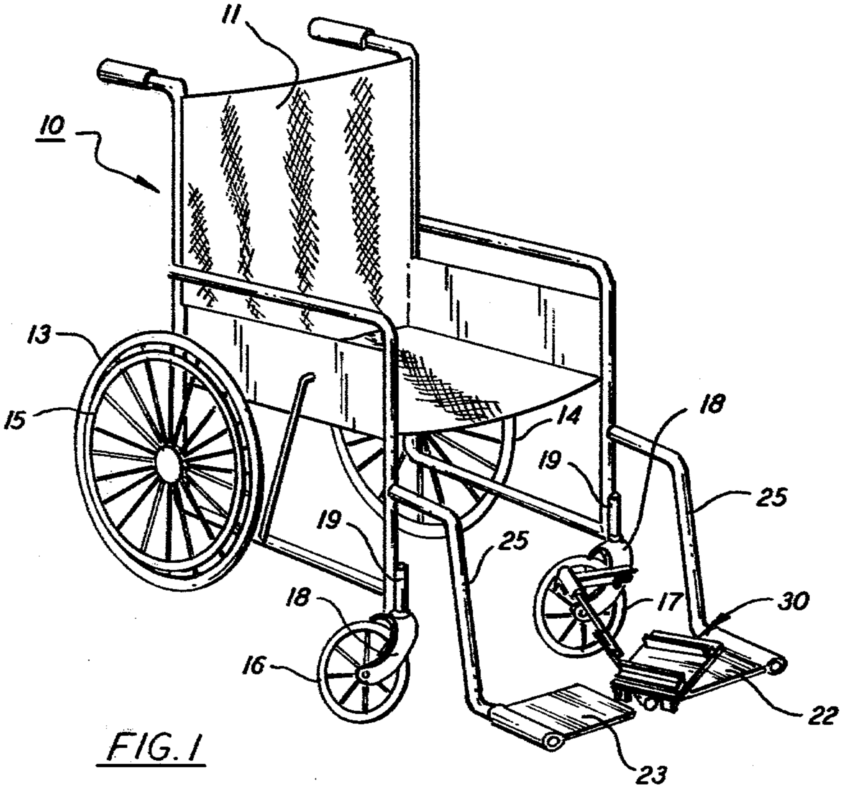
FIG. 1 is a perspective view of a wheelchair apparatus embodying the steering mechanism of the present invention showing the steering mechanism attached to the left front footrest of the chair.

Referring initially to FIG. 1, there is shown a wheelchair, generally referenced 10, of typical construction. The chair includes a conventional folding frame for supporting a backrest 11 and a seat 12 upon which the chair occupant may be comfortably seated. A pair of relatively large traction wheels 13, 14 are rotatably supported in the frame to the rear of the chair. The traction wheel may include smaller diameter hand rim 15—15 secured to the outside face of the wheel which can be gripped by the occupant to enable him or her to turn the wheel and thus propel the chair. A second pair of smaller wheels, which will hereinafter be referred to as steering or swivel casters 16 and 17, are secured to the frame at the front of the chair. The steering casters are connected to the frame using conventional support forks 18—18. In assembly, the forks are pivotably mounted for rotation about a generally vertical axis within sleeves 19—19 welded or otherwise secured to the frame. Left and right hand footrests 22 and 23, respectively, are also affixed to the chair frame by means of forwardly disposed support elements 25—25.

Normally, during the operation of this type of wheelchair, the swivel mounted front steering casters are permitted to freely move about their vertical axes. Steering, which is usually achieved by operating the larger traction wheels, is generally not a problem when the two larger wheels can both be manipulated by the occupant of the chair. In the event the swivel casters become turned perpendicular to the chair's intended direction of travel, a counter rotation movement of the traction wheels is enough to bring the casters back to a more appropriate forward tracking posture. If, however, the chair occupant has the use of only one hand, canting of a steering caster may prove to be a serious problem in that turning of only one wheel will cause the chair to track in a circle. By the same token, in the event one of the casters strikes an obstruction, the caster will be easily and sometimes forcefully turned to one side. This can create a potentially dangerous situation and, in the case where the chair is equipped with a leg operated steering device, can translate a violent twisting action to the leg through the steering mechanism.

The present wheelchair apparatus is equipped with a relatively simple foot operated steering mechanism generally noted as 30, that provides a high mechanical advantage so that it can be easily manipulated by the user. Beyond this, the steering mechanism contains a built-in safety feature which acts to limit the amount of steering movement afforded the casters thus avoiding the above-noted problems associated with the more conventional free-swivelling casters.

With further reference to the remaining drawing, the present steering mechanism includes a turntable 31 that is mountable upon one of the chair supported footrests. Although the turntable may be mounted on either one of the footrests as required, it is herein shown mounted upon left hand rest 22. In assembly, a bifurcated mounting plate 32 is secured to the top surface of the footrest using screws 33—33 or any other suitable means. A precision, low fraction, ball bearing 35 is centrally recessed into the top surface of the mounting plate using a relatively tight press fit between the outer race of the bearing and the peripheral wall of the receiving hole. A threaded shaft 36 is passed upwardly through the inner race of the bearing and is threaded into the body of the turntable. A washer 37 is positioned between the bottom surface of the turntable and the inner race of the bearing to enable the turntable to freely swing within the bearing in coplanar relationship with the footrest.

Figure 3:
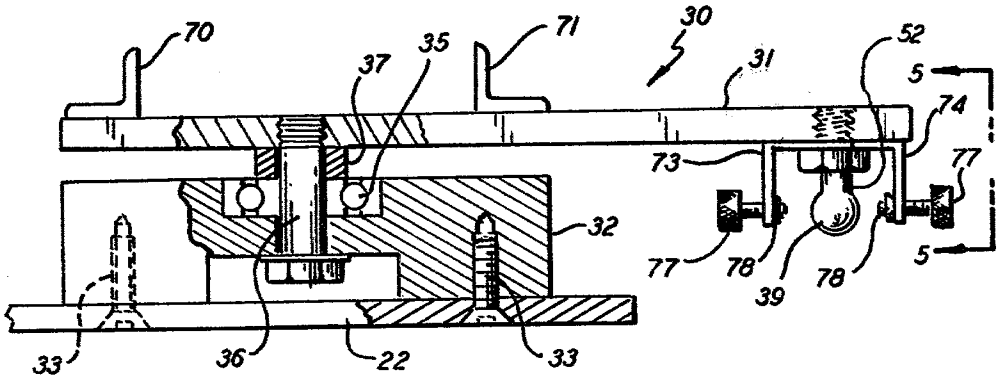
FIG. 3 is a further enlarged view with portions broken away depicting the turntable used in the practice of the present invention.

As best seen in FIG. 3 the turntable is adapted to extend outwardly beyond the distal end of the footrest and has a ball joint 39 threaded therein. The ball joint is positioned upon the longitudinal axis of the turntable in lateral alignment with the threaded shaft. The ball is connected to a socket joint 40 provided in one end of an elongated link 42 which, as will be explained below, serves to operatively connect the turntable with one of the steering casters of the chair.

Figure 4:
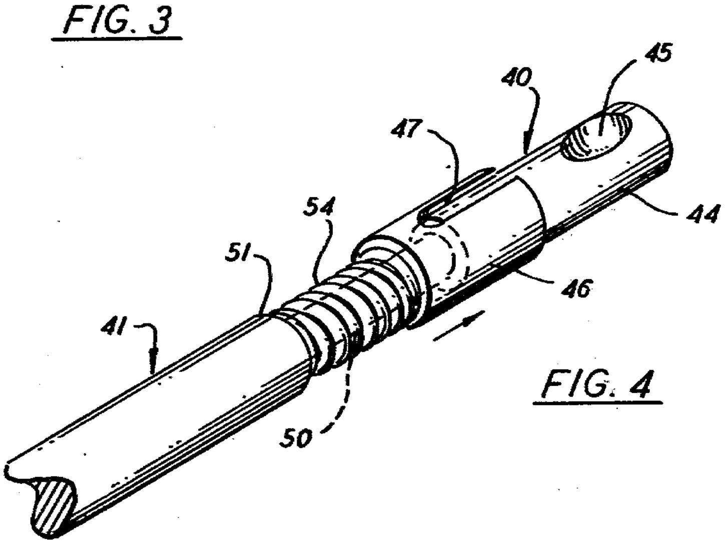
FIG. 4 is an enlarged partial perspective view of the link used in the instant invention.
Figure 5:
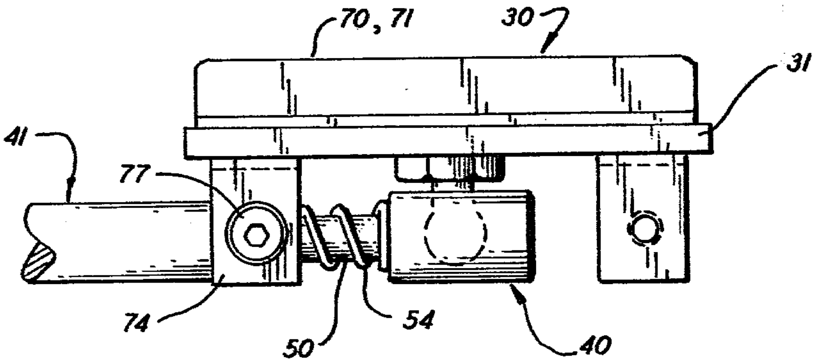
FIG. 5 is a view taken along lines 5—5 in FIG. 3 showing the stop means for retaining the link in greater detail.

With reference to FIG. 4, the socket joint carried at the end of the link 40 includes a cylindrical head 44 in which is machined a socket joint 45 capable of receiving the ball joint 39 and thus providing a seat in which the ball may turn. An end cup 46 is slidably positioned over the cylinder and contains an elongated groove 47 cut axially into its sidewall from the open end thereof. The groove is arranged to slip over the neck 52 of the ball joint and thus hold the ball in the socket when the cup is fully received in a closed position upon the cylinder. The cup in FIG. 4, is shown drawn back against a spring 54 into an open position preparatory to inserting the ball into the socket.

The cylinder of the socket joint is threaded into the end face 51 of the link 41 via a threaded shank 50. A compression spring 54 is wound about the shank which acts between the end face of the link and the bottom surface of the cup to normally bias the cup into a fully closed position. As can be seen the ball and socket arrangement, while furnishing a secure connection, can be quickly and easily disconnected so that the chair can be easily folded.

Figure 2:
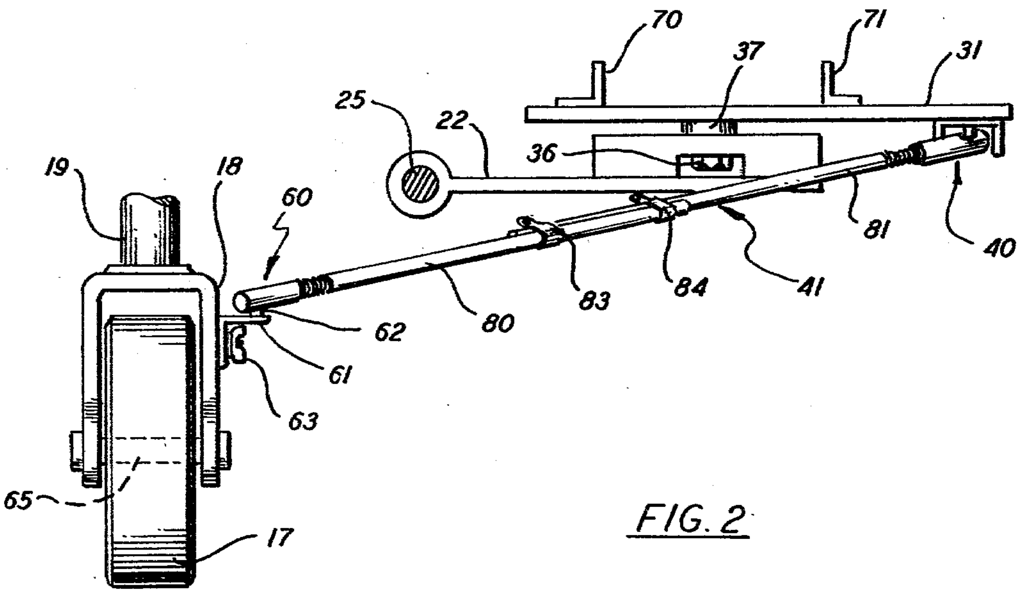
FIG. 2 is an enlarged partial rear view of the steering mechanism shown in FIG. 1 that embodies the teachings of the present invention.

Turning now more specifically to FIGS. 1 and 2, the opposite end of link 40 is pivotably connected to the extended end of a lever bar 61 attached to the fork of the swivel caster using a second ball and socket unit 60. The lever bar, which is in the form of an angle iron, is secured to the fork at its proximal end using a thumb nut that is threaded upon a stud passing through the vertical leg of the bar and the fork. The ball 62 of the second unit is threaded downwardly into the extended horizontal leg of the bar.

In assembly, the bar is affixed to the fork well above the axle 65 of the caster 22 to provide as much leverage to the system as possible.

As best illustrated in FIG. 1, the angle iron extends outwardly from the fork in a generally horizontal direction beyond the periphery of the caster to again provide turning leverage. As should be evident from the disclosure above, through use of a low friction bearing and a series of lever arms, the present steering mechanism makes it possible for the occupant of the chair to move the steering caster of the chair with a simple, easy foot motion. A pair of generally parallel side guides 70 and 71 are adjustably secured to the top surface of the turntable by any suitable means. In use, the guides are disposed on either side of the occupant's shoe or foot and function to prevent the foot from slipping on the turntable as a turning motion is being imparted to the steering mechanism.

A pair of vertically disposed stop tabs 73 and 74 are affixed to the bottom surface of the turntable on either side and forward of the ball joint connector 39. The length of each stop tab is sufficient to contain the body of the link therebetween in assembly. The tabs are adapted to contact the link as it is moved from side to side and thus control the degree of turning permitted the steering caster. The stop tabs, in practice, carry out a twofold function. First, they prevent the steering caster from being forced into a position that would make it difficult for a person having the use of only one arm to move the chair and secondly, they prevent the turntable from being over-rotated to where harm might be done to the user's leg or foot.

A fine adjustment of the stop tab is furnished by means of thumb screws 77—77 that are threaded through the tabs as shown in FIG. 3. A locknut 78 is provided to hold the associated screw in a desired preset position. The thumb screws are located in the tabs so that the end face of each screw will contact and arrest the body section of the link as it follows its prescribed path of travel. A second pair of tabs similar to the first are located on the opposite side of the turntable. The second pair of stops are placed in service when the turntable is changed over for use in connection with the right hand footrest. As can be seen, by simply providing a second set of stops, the present steering mechanism can be interchangeably used by either foot as needed.

The length of the link is also made adjustable so that the steering mechanism may be adapted for use in association with many different makes and models of chairs. To this end, the body section of the link is formed in two halves 80 and 81. In assembly, the two halves are laid in axial alignment one over the other, as shown in FIG. 2. A pair of clamps 83 and 84, which encircle the two members, are then tightened down to secure them together after the link has been brought to the desired length.

While this invention has been described with reference to the details as set forth above, it is not limited to the specific structure as disclosed and the invention is intended to cover any modifications or changes as may come within the scope of the following claims.

I claim:

1. A wheelchair apparatus having an occupant seating means carried upon a frame and a plurality of wheels for moving the apparatus, the apparatus further including at least one steering caster carried in a fork that is attached to the frame for rotational movement about a substantially vertical axis for determining the direction of movement of the wheelchair, a footrest secured to said frame, a turntable rotatably mounted upon the footrest in coplanar relationship therewith, said turntable being adapted to receive the foot of the occupant thereupon whereby the turntable can be turned by said foot, a lever bar secured to the fork and extending outwardly therefrom, an elongated link that is operatively connected by pivotable connector means at one end to the extended end of said lever bar and at the other end to the outer periphery of said turntable whereby movement of the turntable will produce a corresponding movement of the wheel, and stop means secured to the turntable on either side of the link for contacting said link and thus limiting the amount of rotation afforded said turntable.

2. The apparatus of claim 1 wherein said stop means further includes a pair of downwardly extended tabs of sufficient length to arrest the link as it moves through its prescribed path of motion.

3. The apparatus of claim 2 that further includes adjustable screw means threaded through each of the tabs so that the shank of the screw means can be moved toward and away from the link.

4. The apparatus of claim 1 wherein the link is connected to the turntable and the lever bar by means of a ball and socket joint.

5. The apparatus of claim 4 wherein each ball and socket joint has a quick release mechanism associated therewith for rapidly disconnecting the ball from the socket.

6. The apparatus of claim 1 where the turntable is rotatably supported upon the footrest by means of a precision ball bearing.

7. The apparatus of claim 1 wherein the lever bar is secured to the fork above the axle of the caster.

8. The apparatus of claim 1 that includes a slide adjustable mechanism operatively associated with the link for adjusting the axial length of said link.

* * * * *